United States Patent
Holgersen

(10) Patent No.: US 7,740,685 B2
(45) Date of Patent: Jun. 22, 2010

(54) PROCESS FOR REMOVAL OF THE CATALYTIC COATING MATERIAL FROM SPENT, DEFECTIVE OR UNUSED METAL SUPPORT CATALYTIC CONVERTERS

(75) Inventor: James Dennis Holgersen, Ridgecrest, CA (US)

(73) Assignee: R.O. Processing, Inc., Forest Hills, NY (US)

(*) Notice: Subject to any disclaimer, the term of this patent is extended or adjusted under 35 U.S.C. 154(b) by 595 days.

(21) Appl. No.: 11/547,345

(22) PCT Filed: Apr. 4, 2005

(86) PCT No.: PCT/US2005/011572

§ 371 (c)(1),
(2), (4) Date: Oct. 3, 2006

(87) PCT Pub. No.: WO2005/098058

PCT Pub. Date: Oct. 20, 2005

(65) Prior Publication Data

US 2008/0282842 A1    Nov. 20, 2008

Related U.S. Application Data

(60) Provisional application No. 60/559,868, filed on Apr. 5, 2004.

(51) Int. Cl.
   C22B 61/00    (2006.01)
   C22B 3/12     (2006.01)
(52) U.S. Cl. .................................................... 75/416
(58) Field of Classification Search ............... 75/416
   See application file for complete search history.

(56) References Cited

U.S. PATENT DOCUMENTS 3,469,971 A * 9/1969 Leopard .................... 423/22
5,102,632 A * 4/1992 Allen et al. ................. 423/22
5,160,711 A  11/1992 Atkinson
5,279,464 A   1/1994 Geigerich
5,304,359 A   4/1994 Duyvesteyn et al.
2008/0282843 A1  11/2008 Holgerson

FOREIGN PATENT DOCUMENTS

JP    05186840 A    7/1993

OTHER PUBLICATIONS

CRC Handbook of Chemistry and Physics. 75th edition. 1988. p. D-146.*
Suzuki, Masahito, "Technology on Recovery and Recycle of Catalyst for Motor Vehicles," JETI, 46(5), pp. 56-58 (1998) and Examiner translation.
Mishra, Rajesh Kumar, "A Review of Platinum Group Metals Recovery from Automotive Catalytic Converters," Precious Metals, pp. 449-474 (1993).
Kuo-Ying, et al., "Rhodium, Platinum and Palladium Recovery from New and Spent Automotive Catalysts," Precious Metals, pp. 343-349 (1993).
Hoffmann, J.E., "Recovering Platinum-Group Metals from Auto Catalysts," Journal of Metals, 40(6), pp. 40-44 (1988).

* cited by examiner

*Primary Examiner*—George Wyszomierski
*Assistant Examiner*—Tima M McGuthry-Banks
(74) *Attorney, Agent, or Firm*—Edell, Shapiro & Finnan, LLC

(57) ABSTRACT

Process for recovering catalyst coating material from a supporting structure, such as, for example, a catalytic converter assembly having a metal mantle, including contacting the catalytic coating material with a sodium, potassium or ammonium hydroxide-containing compound at an elevated temperature; and rinsing with a liquid and filtering the solid catalyst coating material from the solution.

24 Claims, No Drawings

PROCESS FOR REMOVAL OF THE CATALYTIC COATING MATERIAL FROM SPENT, DEFECTIVE OR UNUSED METAL SUPPORT CATALYTIC CONVERTERS

CROSS-REFERENCE TO RELATED APPLICATIONS

This application claims priority under 35 U.S.C. §119 from International Application No. PCT/US2005/011572, filed Apr. 4, 2005, which was published in English, and claims the benefit under 35 U.S.C. §119(e) of U.S. provisional application Ser. No. 60/559,868, filed Apr. 5, 2004, the complete disclosures of which are incorporated herein by reference.

BACKGROUND OF THE INVENTION

1. Field of the Invention

The invention relates to destruction of the bonding between a catalyst coating material and its underlying metal support structure, and subsequent removal of the catalyst material from spent, defective, or unused metal support catalytic converters.

2. Brief Description of the Related Art

Acid leach chemistry or purely mechanical means, such as water pressure spraying, are generally utilized to remove certain materials containing catalytic metals from other materials to which they are bonded. For example, catalyst coating material may generally be provided on a supporting structure which is comprised of steel, including steel alloys. The catalyst coating material may be bonded to the supporting structure. Since the catalyst material often comprises valuable metals, such as, for example, platinum, palladium, rhodium or other valuable metals, it is desirable to try to recover these metals. In addition, the catalyst material may also comprise potentially hazardous or toxic metals whose disposal may be highly regulated by various governments. A disadvantage with acid leach processes, which are currently employed to remove the metal catalyst from catalytic converters, is that a significant amount of iron may be leached from the metal support structure. The presence of iron severely complicates the refining of the recovered catalyst metals and may have an adverse effect on the amount of refined platinum, palladium and rhodium that can be ultimately recovered. The prior processes also often employ chemicals which are expensive and may be toxic, and could be likely to harm the environment. Another disadvantage with prior processes is that they tend to leave behind a significant amount of the valuable or hazardous metals. This means that further processing by other means is generally required to effectuate their removal or disposal.

A need exists for an improved process for removing metal containing coatings from a supporting metal structure, and in particular where the coating contains a precious metal and other metals such as nickel, and where the supporting metal structure comprises a steel structure.

SUMMARY OF THE INVENTION

The invention provides a process for recovering catalyst coating material from a supporting structure, such as, for example, a catalytic converter assembly having a metal mantle, including contacting the catalytic coating material with a sodium, potassium or ammonium hydroxide-containing compound at an elevated temperature; rinsing with a liquid and filtering the solid catalyst coating material from the solution.

The invention provides a reliable, economic solution to recovering valuable metals from catalyst coating material.

The invention provides a process which results in the production of by products which are easy to safely dispose of, and minimize potential harm to the environment.

DETAILED DESCRIPTION OF THE PREFERRED EMBODIMENTS

Description/Specification of the Invention

The invention provides a process for removing catalyst coating material from a metal support structure. For example, in accordance with a preferred embodiment of the invention, the process may be used for the removal of catalyst coating material from spent, defective or unused catalytic converters, including converters where the supporting structure may comprise steel. The process of the invention preferably is carried out whereby the physical bond that fixes the catalyst coating material containing any combination of platinum group metals and other elements onto the underlying metal support structure of metal support catalytic converters is destroyed or broken and the said catalytic coating material is subsequently removed from the support structure for recycling of the valuable metals contained in the coating material. The removal process of separating the catalytic coating material from the metal support structure of spent, defective or unused metal support catalytic converters or converter assemblies also commonly known as steel mantle catalytic converters, metal substrate catalytic converters, or other terms, is then accomplished by either a simple rinsing or spraying using a liquid such as water, or some other mechanical means. These converters and converter assemblies are primarily used to reduce air pollution emissions of mobile and stationary internal combustion engines such as those in automobiles and power generators. In addition, the process might also be applicable for recovery of catalytic coating material from catalytic crackers used in the petroleum refining industry and other applications where catalytic coating material containing valuable metals are fixed to a metal support structure.

The process according to the invention is accomplished by effecting contact between the catalytic coating material contained in or on the metal support catalytic converters and a strong basic compound, preferably having a pH of 12 or higher, most preferably a sodium, potassium or ammonium hydroxide-containing chemical or material, or combinations or mixtures of one or more of these compounds of a minimum of 1% sodium, potassium or ammonium hydroxide content by weight, at elevated temperatures. The sodium, potassium or ammonium hydroxide-containing chemical or material is put in contact with the catalyst coating material to destroy the bonding between the catalyst coating material and the underlying metal structure. Once the bond is destroyed, then the catalyst coating material may be removed by a simple water rinse, or by mechanical agitation while immersed in a mild acid solution, or a pressure spray, or a combination of one or more of these. The contacting step described above can be effected by gaseous, liquid or solid means, or a combination thereof, whereby a sodium, potassium or ammonium hydroxide-containing chemical or material may be heated in conjunction with the metal support catalytic converter being processed, or one or more of the components may be heated separately. Preferably, the contacting of the sodium, potassium or ammonium hydroxide-containing chemical with the catalytic coating material may occur at temperatures ranging from about 50 C to the melting point of the underlying metal structure of the metal support catalytic converters.

The sodium, potassium or ammonium hydroxide-containing material may be supplied in a gaseous, liquid or solid phase, and the catalyst coating material and sodium, potassium or ammonium hydroxide-containing material are brought into contact. There are many possible implementations of the invention, but excellent results have been achieved by immersing the catalytic converters in a solution of commercially available liquid sodium hydroxide solution consisting of 51 percent water and 49 percent sodium hydroxide for 1 hour, then removing the converters from the solution, allowing the excess solution to drain from the converters for one hour (or by using compressed air to blow out the excess solution), and then heating the so treated catalytic converters or converter assemblies with a suitable heating means, such as an electric furnace at about 600 C for about one hour. Alternately, heating with a suitable heating means may be accomplished by heating either the sodium, potassium or ammonium hydroxide-containing material, or the converter material, or both. The bond between the catalyst coating material and the underlying metal support structure will be destroyed during the period that the converter material is at an elevated temperature and in contact with either the sodium, potassium or ammonium hydroxide-containing material.

Once the converters have been taken from the furnaces and cooled, the catalyst coating material can be removed from the converter bodies or assemblies by simple mechanical means such as a high-pressure water spray tank or mechanical agitation in a water rinse tank. Best results are achieved, however, when after heating in the electric furnace, the converter bodies or assemblies are placed in a suitable tank containing a solution of water and either hydrochloric or citric acid. The solution should be maintained at a pH of from about 2.5 to 3.3 for about 24 hours with continuous agitation or circulation of the tank solution. Preferably the pH may be maintained at; a level of about 3.0. This treatment results in the reaction of any remaining sodium hydroxide in the converters or converter assemblies with the selected acids to produce either water plus sodium chloride or water plus sodium citrate (depending on the acid used), greatly reducing the surface tension of the catalyst coating material and allowing for removal of said material with a minimum of effort by mechanical means such as water sprays or dipping rinses. The now loose, solid catalyst coating material is easily recovered from the spray or rinse solution by filtration or other known techniques for separating solids from liquids.

One advantage of the invention is that unlike acid leach chemistry, under this process virtually no iron is leached into solution from the metal support structure of the converters or converter assemblies, which in all current implementations are steel alloys. However, because of the heat treatment with sodium, potassium or ammonium hydroxide, some of the metals in the catalyst coating material, including, but not limited to, for example, nickel, platinum, palladium and rhodium may be converted to water soluble hydroxides. These metal hydroxides will dissolve in the rinse or soak solution as the catalyst coating material removal process is conducted. The aforementioned metal hydroxides in solution can be readily converted to solid form and removed from solution by using either electrowinning, electrolytic precipitation, precipitating with metal chelating chemicals or other known techniques. Alternatively, for a zero liquid discharge operation, the process solution may be evaporated with a sludge dryer, capturing the solid catalyst coating material and any metal hydroxides that may have formed. Depending on the specific hydroxide-containing chemical used, it may be necessary to pass the resulting fumes through a scrubber. Regardless, this zero-discharge step can also be performed after removing the metals via either electrowinning, electrolytic precipitation, precipitation with metal chelating chemicals or other means to achieve a zero discharge operation.

The invention described above has been found to be simple, extremely economical and is highly effective in destroying the bond between the catalyst coating material and the underlying metal support structure in all types of metal support catalysts currently in use for reduction of air pollutants from internal combustion engines. This breaking of the bond allows for easy removal of the valuable spent, defective or unused catalyst coating material for subsequent recovery of the platinum group metals and the other metals contained in the catalyst coating material. In addition, the invention may also be effective in the recovery of valuable metals from other catalysts and applications. Furthermore, the invention has significant cost and environmental advantages in that there is neither any release of heavy metals in any form nor any use of toxic chemicals. Specifically, inexpensive sodium hydroxide (also known as caustic soda or lye) is the principal process chemical of choice. The resulting process chemicals and byproducts, depending on the specific implementation of the invention, consist of essentially sodium hydroxide, hydrochloric acid, (or citric acid), all of which can be reused, salt (sodium chloride), which can be easily and safely disposed of, or biodegradable sodium citrate.

While the invention has been described with reference to specific embodiments, the description is illustrative and is not to be construed as limiting the scope of the invention. For example, though immersion is discussed as a preferred mechanism for contacting the converter with the hydroxide containing composition, a continued or recycled spraying of the converter may also be used. Various modifications and changes may occur to those skilled in the art without departing from the spirit and scope of the invention described herein and as defined by the appended claims.

I claim:

1. A process for recovering catalyst coating metals from a catalytic converter assembly where a catalyst coating material is bonded to a metal supporting structure, the method comprising the steps of:
   a) contacting the catalyst coating material supported on the metal supporting structure of the catalytic converter assembly with a liquid sodium hydroxide solution consisting of about 51 percent water and about 49 percent sodium hydroxide for a period of time sufficient to allow penetration of the solution;
   b) removing the catalytic converter assembly from the liquid sodium hydroxide solution;
   c) draining excess solution from the converter assembly;
   d) heating the catalytic converter assembly in a furnace at approximately 600 C for at least about one hour;
   e) removing the catalytic converter assembly from the furnace;
   f) cooling the catalytic converter assembly; and
   g) removing the catalyst coating material from the converter assembly, wherein the process breaks a bond between the catalyst coating material and the metal in the supporting structure.

2. The process of claim 1, wherein the process further comprises, prior to the step of removing the catalyst coating material from the catalytic converter assembly in step g), immersing the converter assembly in a mild acidic solution containing water and hydrochloric acid or citric acid and filtering the solution of step g, to recover the catalyst material from the solution.

3. The process of claim 2, further including the step of maintaining the mild acidic solution containing water and hydrochloric or citric acid at a pH of about 2.5 to 3.3.

4. The process of claim 3 including agitating the mild acidic solution containing water and hydrochloric or citric acid.

5. The process of claim 1, wherein the period of time sufficient to allow penetration of the solution is about 1 hour.

6. A process for recovering catalytic material from a supporting structure, comprising the steps of:
   a) contacting the catalytic coating material supported on the supporting structure with a strong basic compound of pH of 12 or greater, at an elevated temperature;
   b) removing the catalytic coating material supported on the supporting structure from further contact with the basic compound of pH of 12 or greater;
   c) removing excess strong basic compound of pH of 12 or greater;
   d) heating the catalytic coating material and the supporting structure; and
   e) removing the catalytic coating material from the supporting structure, wherein the supporting structure is comprised of metal, and the process breaks a bond between the catalytic coating material and the metal in the supporting structure.

7. The process of claim 6, wherein the strong basic compound is a chemical or material containing at least one selected from the group consisting of sodium hydroxide, potassium hydroxide, ammonium hydroxide, and mixtures of these compounds.

8. The process of claim 7, wherein the chemical or material containing the sodium hydroxide, potassium hydroxide or ammonium hydroxide is supplied in a gaseous phase.

9. The process of claim 7, wherein the chemical or material containing the sodium hydroxide, potassium hydroxide or ammonium hydroxide is supplied in a liquid phase.

10. The process of claim 7, wherein the chemical or material containing the sodium hydroxide, potassium hydroxide or ammonium hydroxide is supplied in a solid phase 11. The process of claim 6, wherein the strong basic compound is supplied in the form of one or more of a liquid phase, a solid phase, a gaseous phase, or a combination thereof.

12. The process of claim 7, wherein the strong basic compound is provided in a concentration of at least about 1% content by weight of the sodium hydroxide, potassium hydroxide and/or ammonium hydroxide.

13. The process of claim 6, wherein the elevated temperature of step a) is about 50 C to about the melting point temperature of the underlying supporting structure.

14. A process for recovering catalytic material from a supporting structure, comprising the steps of:
   a) contacting the catalytic coating material supported on the supporting structure with a strong basic compound of pH of 12 or greater, at an elevated temperature;
   b) removing the catalytic coating material supported on the supporting structure from further contact with the basic compound of pH of 12 or greater;
   c) removing excess strong basic compound of pH of 12 or greater;
   d) heating the catalytic coating material and the supporting structure; and
   e) removing the catalytic coating material from the supporting structure, wherein the step of heating in step d) is followed by immersing the catalytic converter assembly in a mild acidic solution having a pH of about 2.5 to about 3.3, and agitating the solution.

15. A process for recovering catalyst coating material containing platinum group metals from a catalytic converter assembly having a metal supporting structure comprising the steps of:
   a) contacting the catalyst coating material with a material containing sodium hydroxide, potassium hydroxide or ammonium hydroxide at a temperature of at least 50 C or greater;
   b) heating the catalytic converter assembly in an oven at an elevated temperature;
   c) removing the catalytic converter assembly from the oven;
   d) immersing the catalytic converter assembly in an acidic solution; and
   e) removing the catalyst coating material from the acidic solution.

16. A process for recovering catalyst coating metals from a catalytic converter assembly where a catalyst coating material is bonded to a metal supporting structure, the method comprising the steps of:
   a) contacting the catalyst coating material supported on the metal supporting structure of the catalytic converter assembly with a chemical or material containing sodium hydroxide, potassium hydroxide or ammonium hydroxide for at least about 1 hour;
   b) heating the catalytic converter assembly with heating means;
   c) removing the catalytic converter assembly from further contact with the chemical or material containing the sodium hydroxide, potassium hydroxide or ammonium hydroxide;
   d) removing the catalytic converter assembly from the heating means;
   e) cooling the catalytic converter assembly; and
   f) separating the catalyst coating material from the converter assembly, wherein the step of separating the catalyst material from the converter assembly in step f) further comprises immersing the catalytic converter assembly in a mild acidic solution containing water and hydrochloric or citric acid for about 24 hours or longer.

17. The process of claim 16, wherein the solution is agitated.

18. The process of claim 17, wherein the acidic solution is maintained at a pH of about 2.5 to about 3.3.

19. The process of claim 16, wherein the chemical or material containing the sodium hydroxide, potassium hydroxide or ammonium hydroxide is supplied in a gaseous phase.

20. The process of claim 16, wherein the chemical or material containing the sodium hydroxide, potassium hydroxide or ammonium hydroxide is supplied in a liquid phase.

21. The process of claim 16, wherein the chemical or material containing sodium hydroxide, potassium hydroxide or ammonium hydroxide is supplied in a solid phase.

22. The process of claim 16, wherein the step of separating the catalyst coating material from the converter assembly in step f) further comprises applying a pressure of liquid to the converter assembly.

23. The process of claim 16, wherein the step of heating the catalytic converter assembly with heating means in step b) further comprises introducing preheated material containing sodium hydroxide, potassium hydroxide or ammonium hydroxide to the catalytic converter assembly.

24. A process for recovering catalyst coating material from a catalytic converter assembly where a catalyst coating material is bonded to a metal supporting structure, the method comprising the steps of:

a) contacting the catalyst coating material supported on the metal supporting structure of the catalytic converter assembly with a chemical or material containing sodium hydroxide, potassium hydroxide or ammonium hydroxide for at least about 1 hour;

b) heating the catalytic converter assembly with heating means;

c) removing the catalytic converter assembly from further contact with the chemical or material containing the sodium hydroxide, potassium hydroxide or ammonium hydroxide;

d) removing the catalytic converter assembly from the heating means;

e) cooling the catalytic converter assembly; and f) separating the catalyst coating material from the converter assembly, wherein the step of separating the catalyst coating material from the converter assembly in step f) further comprises mechanical agitation of the converter assembly in a liquid bath.

\* \* \* \* \*